(12) United States Patent
Beistegui Chirapozu et al.

(10) Patent No.: US 8,814,195 B2
(45) Date of Patent: Aug. 26, 2014

(54) FOLDING BICYCLE, PARTICULARLY A PEDAL-ASSIST BICYCLE

(71) Applicant: Beistegui Hermanos, S.L., Vitoria-Gastéiz (ES)

(72) Inventors: José Luis Beistegui Chirapozu, Vitoria-Gastéiz (ES); Javier Cuñado Landa, Vitoria-Gastéiz (ES)

(73) Assignee: Beistegui Hermanos, S.L. (ES)

( * ) Notice: Subject to any disclaimer, the term of this patent is extended or adjusted under 35 U.S.C. 154(b) by 0 days.

(21) Appl. No.: 13/647,442

(22) Filed: Oct. 9, 2012

(65) Prior Publication Data
US 2013/0087989 A1 Apr. 11, 2013

(30) Foreign Application Priority Data

Oct. 11, 2011 (EP) ..................................... 11382318

(51) Int. Cl.
*B62K 15/00* (2006.01)
(52) U.S. Cl.
CPC ................ *B61K 3/10* (2013.01); *B62K 15/006* (2013.01)
USPC ......... 280/287; 280/281.1; 280/295; 280/302
(58) Field of Classification Search
CPC ............................... B62K 15/006; B62K 3/10
USPC ............. 280/278, 287, 281.1, 302, 293, 295, 280/261
See application file for complete search history.

(56) References Cited

U.S. PATENT DOCUMENTS

| 4,182,522 A * | 1/1980 | Ritchie | 280/278 |
| 6,799,771 B2 * | 10/2004 | Bigot | 280/278 |
| 6,971,658 B2 * | 12/2005 | Chao | 280/278 |
| 6,979,012 B2 * | 12/2005 | Sherman | 280/278 |
| 7,490,842 B1 * | 2/2009 | Ulrich et al. | 280/278 |
| 2005/0062256 A1 * | 3/2005 | Chen | 280/287 |
| 2007/0013162 A1 * | 1/2007 | Whyte | 280/278 |

FOREIGN PATENT DOCUMENTS

| ES | 1072110 U | 5/2010 |
| GB | 1267674 | 3/1972 |
| NL | 1016175 C1 | 3/2002 |
| WO | 03022671 A1 | 3/2003 |

* cited by examiner

*Primary Examiner* — Joseph M Rocca
*Assistant Examiner* — Jacob Knutson
(74) *Attorney, Agent, or Firm* — Cantor Colburn LLP (57) ABSTRACT

The present invention relates to a folding bicycle assisted by an electric motor, comprising a frame with a down tube (4) with a back end with a seat tube (7) and a front end with a steering tube (10) housing a stem (9) connected in the upper zone to a handlebar (101) and in the lower zone to a front fork (11), a back fork (2) coupled to the back end of the down tube (4), a folding mechanism which allows folding the bicycle (1) about an articulating pin (12) to at least one folded position, and a locking mechanism for keeping the bicycle in said folded position.

14 Claims, 8 Drawing Sheets

FOLDING BICYCLE, PARTICULARLY A PEDAL-ASSIST BICYCLE

TECHNICAL FIELD OF THE INVENTION

The present invention is comprised in the technical field of folding bicycles and, particularly in the technical field of pedal-assist folding bicycles, assisted by an electric motor.

BACKGROUND OF THE INVENTION

Folding bicycles have been known for many years. These bicycles conventionally comprise a hinge system located in the down tube of the frame which allows laterally folding the back portion of the bicycle over the front portion.

In different pedal-assist bicycle models, the battery is located precisely in the down tube of the frame, such as for example in the frame described in Utility Model ES-ES1072110-U, so it is impossible to provide the down tube with an articulation or hinge. In order to provide pedal-assist bicycles in which the battery is arranged in the diagonal frame of the frame, folding systems have been conceived such as the one described for example in patent application WO03022671A1, which allows laterally folding the back portion of the bicycle over its front portion based on an articulation provided in the attachment of the down tube with the seat tube. However, the location of this articulation is at a point where many loads coincide when the bicycle is in use, so this system is complicated and susceptible to breaks.

BRIEF SUMMARY

The invention overcomes the drawbacks of the state of the art described above by means of a folding bicycle, particularly a pedal-assist bicycle, comprising a frame with a down tube with a back end with a seat tube and a front end with a steering tube susceptible to housing a stem connected in the upper zone to a handlebar and in the lower zone to a front fork, a back fork coupled to the back end of the down tube and a bottom bracket, a folding mechanism which allows folding the bicycle about an articulating pin to at least one folded position, and a locking mechanism for keeping the bicycle in said folded position, the folding bicycle being wherein the bottom bracket is integrated in a lower portion of a connecting part emerging in the lower zone of a front portion of the back fork;

the connecting part comprises an upper side with a back portion attached in the lower zone to the front portion of the back fork and with at least one cantilevered axial extension which extends below and is connected to the down tube in the unfolded position of the bicycle;

the axial extension comprises at least one front end articulated in the lower zone to the down tube by means of a transverse shaft, such that the back fork and the connecting part form a pivoting block susceptible to rotating jointly in a vertical plane towards the steering tube to said folded position;

the front portion of the fork is connected to the back end of the down tube in the unfolded position of the bicycle.

According to the invention, the connecting part can be a triangular part the upper side of which comprises said axial extension, and comprising a front upper vertex in which said front end articulated to the down tube is located and a lower vertex in which the bottom bracket is integrated. Preferably, the connecting part further comprises a housing which is axially aligned with the seat tube in the unfolded position of the bicycle for housing the lower portion of a seat post lockable in the seat tube by fixing means such as, for example, a quick-tightening clamp, such that the lower portion of the seat post prevents the folding of the bicycle.

The front portion of the back fork can comprise a front face in which an inner seal made of an elastically flexible material is arranged, which, is trapped between the back end of the down tube and the front face of the front portion of the back fork in the unfolded position of the bicycle. The back end of the down tube can comprise a back portion projecting from the seat tube.

In one embodiment of the articulation mechanism, the upper side of the connecting part comprises the axial extension comprising a pair of front ends or alternatively two axial extensions spaced from one another with respective front ends. In both cases, the front ends are spaced from one another and provided with respective cylindrical holes transversely aligned with one another and with respect to a cylindrical passage of a lug emerging in the lower zone of the down tube, such that the transverse shaft is housed in said cylindrical passage and in said cylindrical holes, an articulation thus being formed for the pivoting block. In this embodiment of the articulation mechanism, the cylindrical holes in the axial extensions can have respective pairs of opposite inner ribs fitting in a pair of complementary outer longitudinal grooves in the periphery of the transverse shaft, such that the transverse shaft rotates integrally with the axial extensions of the upper side of the connecting part.

In this embodiment of the articulation mechanism, a locking mechanism can be provided in which the transverse shaft comprises a cylindrical inner axial passage extending internally through at least a portion of the length of the transverse shaft and having an open end and a closed portion, opposite the open end. An also cylindrical guide element diagonally traversed by a perpendicular pin is slidingly housed in the end portion adjacent to the open end of the axial passage, which perpendicular pin also traverses respective slits located in diagonally opposite positions of the wall of the transverse shaft, and is immobilized by its opposite ends in diagonally opposite openings provided in the wall of one of the cylindrical holes of the front end of one of the axial extensions of the upper portion of the triangular connecting part. Each of the slits has a proximal smaller edge adjacent to the open end of the axial passage and a distal smaller edge spaced from the adjacent end of the open end of the axial passage as well as two opposite larger edges extending between said smaller edges. A compressed coil spring is arranged between the closed portion of the axial passage and the end of the guide element inserted in the axial passage such that it pushes the guide element towards the open end of the axial passage and keeps the perpendicular pin supported against the proximal smaller edges of the respective slits. The coil spring preferably forces the distal end portion of the transverse shaft opposite the open end of the axial passage to emerge laterally from the cylindrical hole of the front end of one of the axial extensions of the upper portion of the triangular connecting part.

Two axially aligned bosses emerging towards the inside of the cylindrical passage can be provided in the lower zone of the lug and they have a height such that they are susceptible to being axially guided in any of the outer longitudinal grooves of the transverse shaft. These outer longitudinal grooves are communicated by two outer radial grooves which are sized for guiding the bosses from one outer longitudinal groove to another, and away from and towards the side recesses, and they can be provided with respective side recesses extending towards the slits of the transverse shaft and are sized for retaining the respective bosses in an intermediate locking position.

The operation of the aforementioned locking mechanism is as follows:

In the use position, i.e., in the unfolded position of the bicycle, the back fork is axially aligned with the down tube and the bosses remain housed in one of the outer longitudinal grooves of the transverse shaft. Once the seat post is extracted from the housing of the triangular connecting part to transition into an intermediate folded position, the pivoting block is folded towards the front wheel such that the chainstays of the back fork are located in a substantially vertical plane, such that the bicycle can roll on its front and back wheels and the front wheel can be steered freely towards the right and left. This intermediate folded position is useful when the bicycle is to be introduced in a space having reduced dimensions, for example in an elevator or in a storage room, or transported through a reduced space, such as for example on stairs or in hallways. In order to be able to perform the folding towards said intermediate folded position, the distal end portion of the transverse shaft is pressed against the force of the coil spring until the perpendicular pin hits against the respective distal smaller edges of the slits and the bosses of the lug are facing and can enter the respective outer radial grooves when the pivoting block connected to the horizontal shaft is rotated. When the distal end portion of the transverse shaft is no longer pressed once the bosses have entered the outer radial grooves and the pivoting block continues to be rotated, the action of the spring makes the bosses enter and remain locked in the side recesses of the outer radial grooves in said intermediate locking position in which the bicycle is folded and locked in the intermediate folded position described above.

In the maximum folded position, in which the front wheel is disassembled and the pivoting block has been folded forward until the elastomeric plate arranged in the front side of the triangular connecting part hits against the lower portion of the down tube such that the back fork is diagonally folded forward and the back wheel is located below the down tube and partially between the arms of the front fork. For transitioning from the intermediate folded position to this maximum folded position of the bicycle, the distal end portion of the transverse shaft is pressed again against the force of the coil spring until the perpendicular pin again hits against the respective distal smaller edges of the slits and the bosses of the lug are again facing and can enter the respective outer radial grooves when the pivoting block connected to the horizontal shaft is further rotated until the bosses enter the other outer longitudinal groove of the transverse shaft such that the horizontal shaft cannot continue rotating such that if the distal end portion of the horizontal shaft is no longer pressed before or after the bosses guided in the outer side grooves have reached that other outer longitudinal groove, the bosses again become misaligned with respect to the outer radial grooves due to the action of the coil spring and the locking mechanism takes a maximum locking position.

As can be deduced from the foregoing description, the present invention solves the drawbacks of the state of the art in a simple and effective manner.

BRIEF DESCRIPTION OF THE DRAWINGS

Aspects and embodiments of the invention are described below based on schematic drawings in which.

DETAILED DESCRIPTION

In the embodiment of the invention shown in the drawings, the pedal-assist folding bicycle -1- comprises a frame comprising a down tube -4- in which the battery -5- and the control means of the battery -5'- are assembled as described in Utility Model ES-ES1072110-U. The down tube -4- extends between the seat tube -6- in which the seat post -3- is housed and the steering tube -10- in which the telescopic stem -9- connected to the handlebar -101- and to the front fork -11- of the front wheel -112- rotates.

The back wheel -227- of the bicycle -1- has a hub which, in a known manner, incorporates an electric motor (not shown in the drawings) for assisting the propulsion of the bicycle -1-, and it is assembled between two chainstays -225- of a back fork -22- integral with a triangular connecting part -23-. The triangular connecting part -23- comprises an upper side -232- the back portion of which emerges in the lower zone of a front portion -226- of the back fork -22-. The front portion of the upper side -232- of the triangular connecting part -23- is formed by two cantilevered axial extensions -233-, the front ends -221- of which (see FIG. 4), corresponding to front upper vertices of the triangular connecting part -23-, are articulated in a transverse shaft -12-. The bottom bracket -236- is integrated in the lower zone -234- of the triangular connecting part -23- in a position corresponding to its lower vertex. The back fork -22- and the triangular connecting part -23- thus form a pivoting block -2- susceptible to pivoting with respect to the down tube -4- in a vertical plane between an unfolded position, in which the front portion -226- of the back fork -22- is connected to the seat tube -6-, and a position folded, in which the pivoting block -2- is pivoted towards the steering tube -10-. The triangular connecting part -23- further comprises a housing -235- which is axially aligned with the seat tube -6- in the unfolded position of the bicycle -1- such that the lower portion of the seat post -3- enters the housing -235- of the triangular connecting part -23-. Although in the unfolded position of the bicycle -1-, the weight of the user would maintain the use position in which the front portion -226- of the back fork -22- remains connected to the seat tube -6- for keeping the lower portion of the seat post -3- in the housing -235- of the triangular connecting part -23- when the bicycle is in use, a quick-tightening clamp -7- has been provided for locking the seat post -3- in the seat tube -6-. For folding the pivoting block -2-, the quick-tightening clamp -7- is loosened and the seat post -3- is extracted from the housing -235- of the triangular connecting part -23- such that the pivoting block -2- is released and can pivot on the transverse shaft -12- towards the steering tube -10-. As deduced from FIG. 1, the back fork -22- remains axially aligned with the down tube -4- in the unfolded position of the bicycle -1-.

Figure 1:
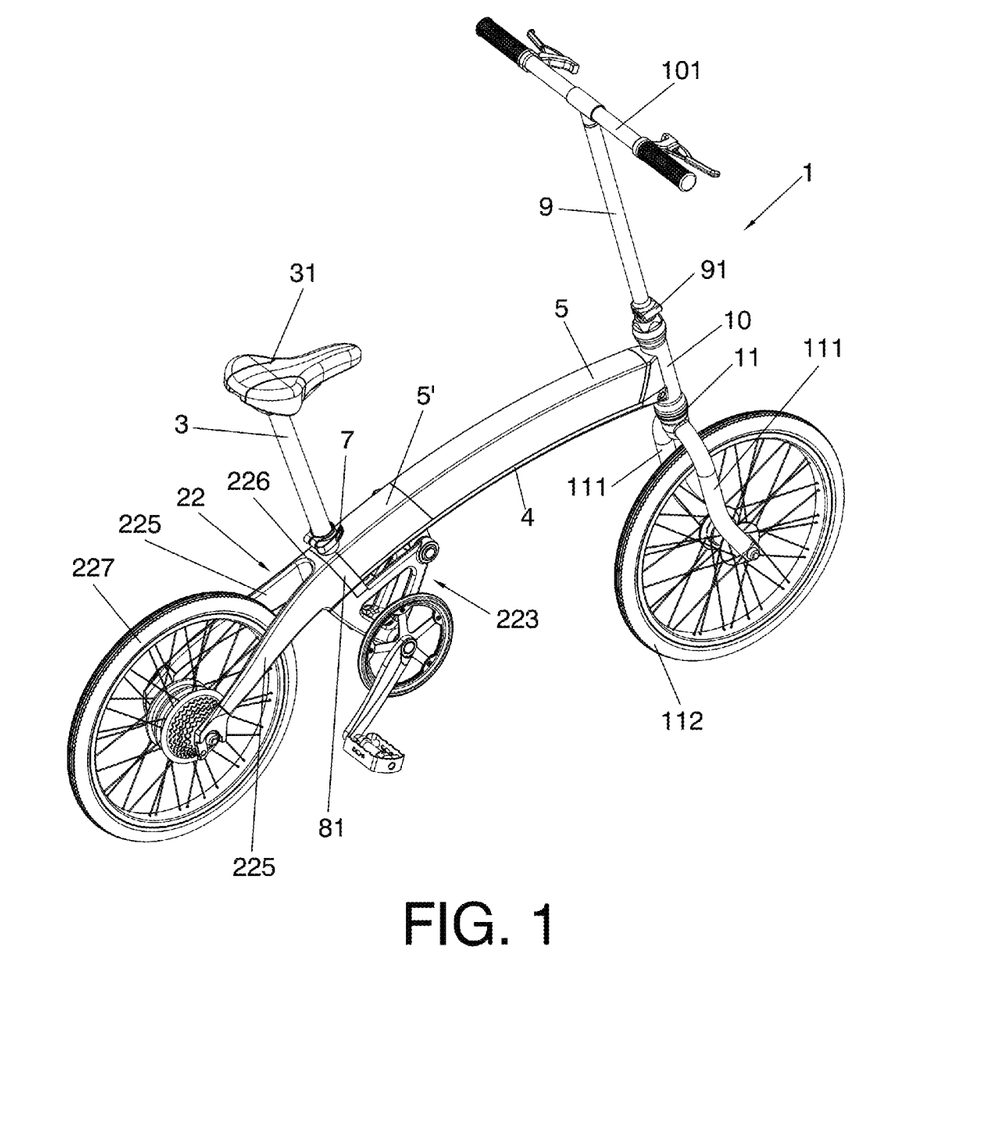
FIG. 1 is a rear perspective view of an embodiment of a pedal-assist bicycle according to the present invention, in the unfolded position.
Figure 1A:
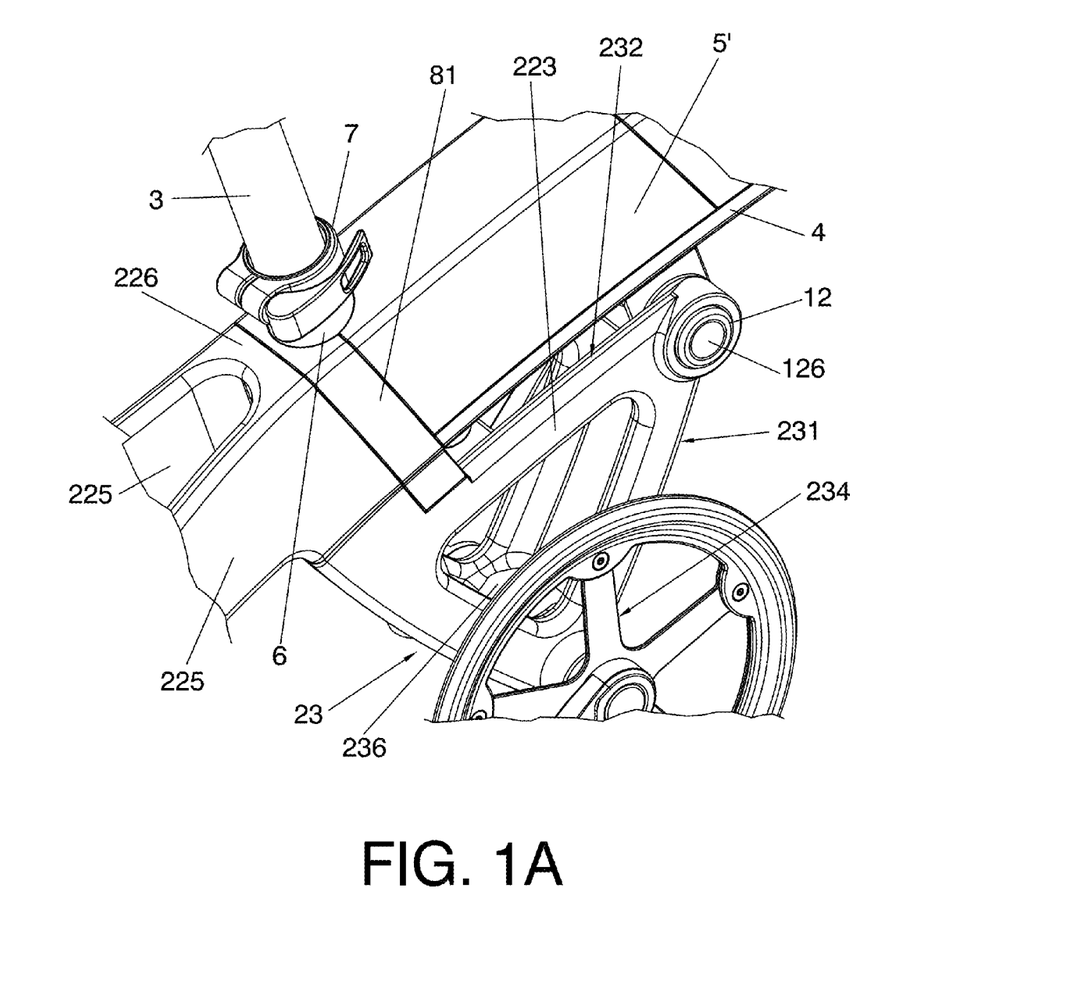
FIG. 1A is a detail view of the folding area of the bicycle shown in FIG. 1.

A half-round inner elastomeric seal -8- is provided in the front portion -226- of the back fork -22- preventing metal/metal contact of the front portion -226- of the back fork -22- and the seat tube -6- and, therefore, it prevents noise from being generated due to metal/metal friction and vibrations from being transmitted between the back fork -22- and the seat tube -6-, and a protective outer seal -81- clamping the back end of the down tube -4- is also provided for preventing the entrance of moisture and foreign matter between the back end portion of the down tube -4- and the front portion -226-, and for protecting the inner seal -8- against the effects of moisture and foreign matter. On the other hand, an elastomeric plate -13- preventing metal/metal contact of the front side -231- of the triangular connecting part -23- and the down tube -4- when the front side -231- of the triangular connecting part -23- remains connected to the down tube -4- in the completely folded position of the bicycle -1- is arranged in the front side -231- of the triangular connecting part -23-.

Figure 2:
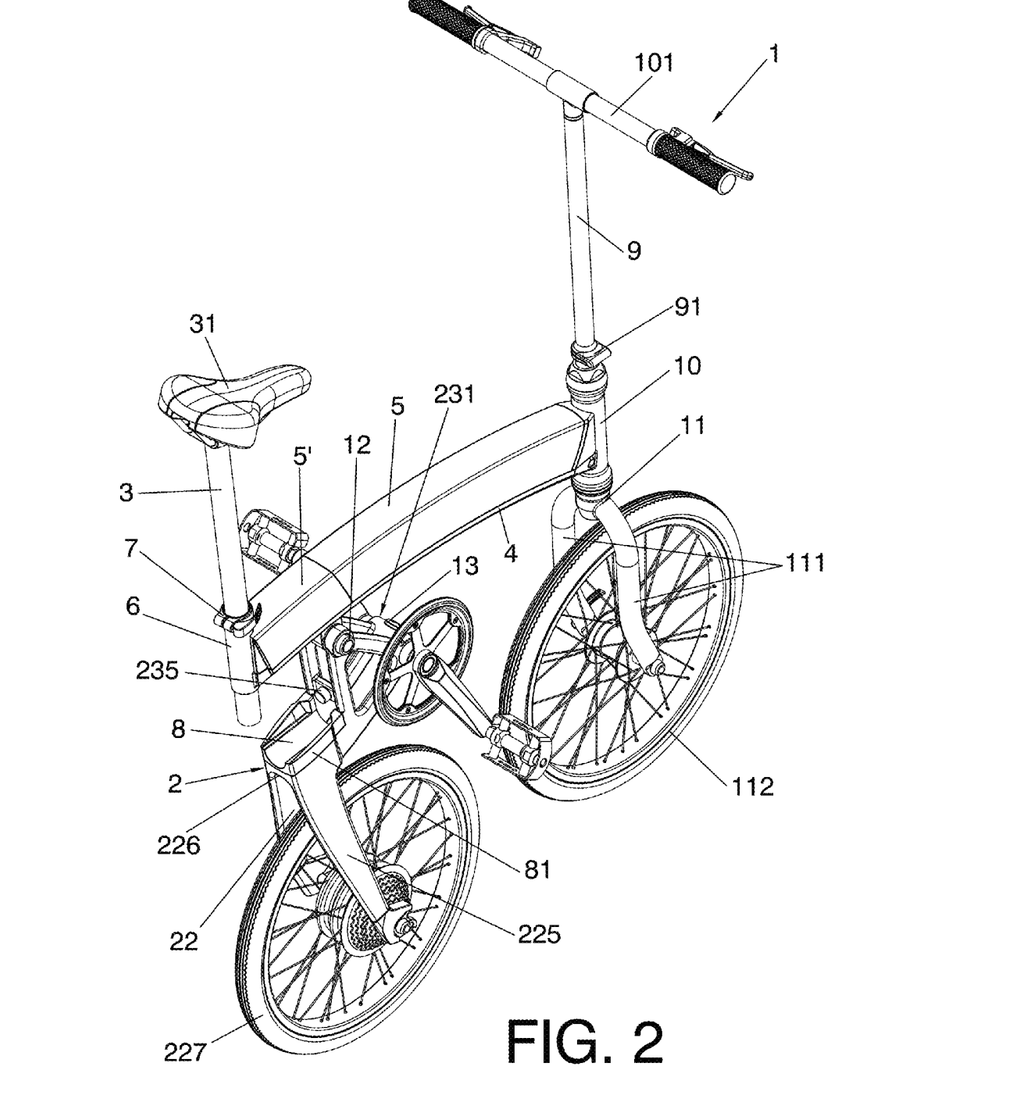
FIG. 2 shows the bicycle of FIG. 1 in an intermediate folded position.
Figure 3:
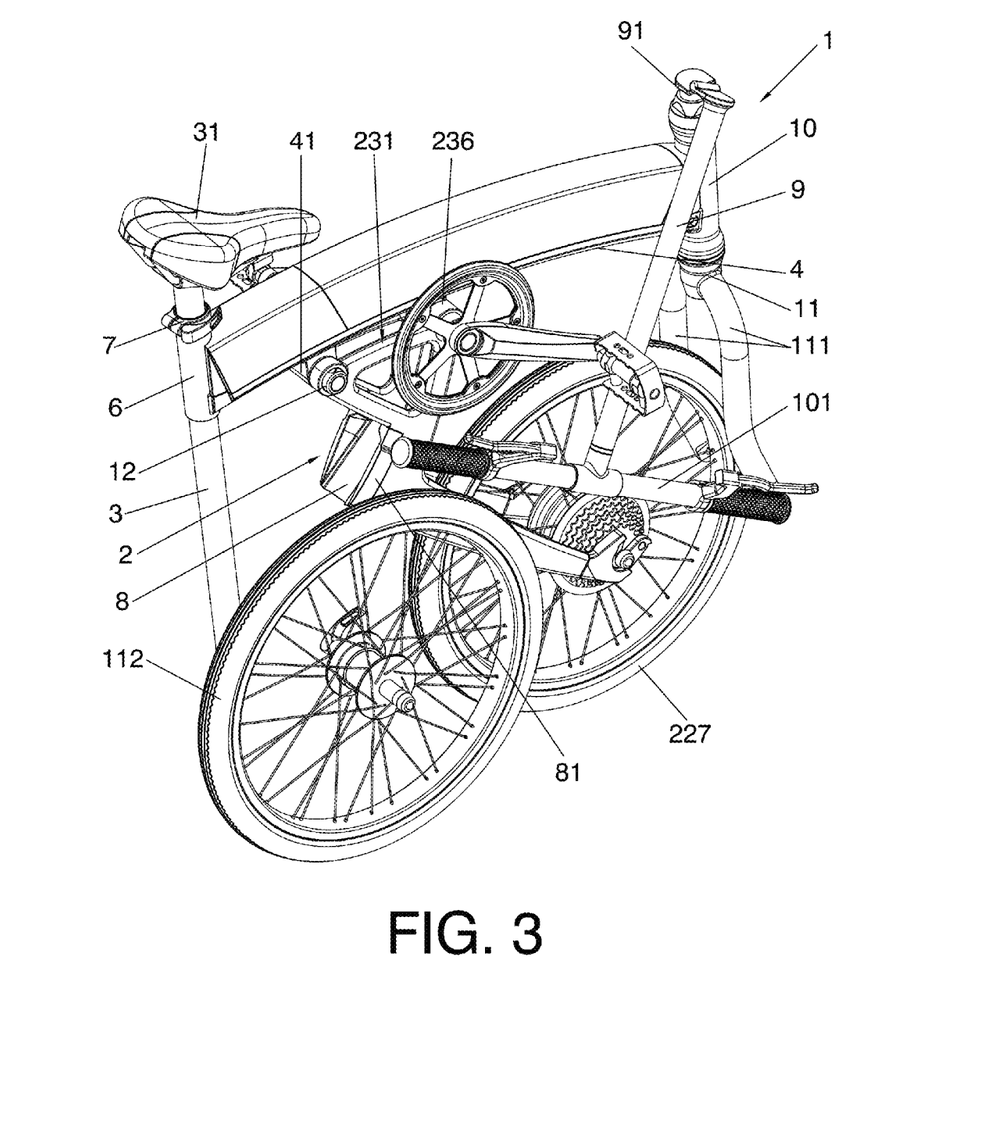
FIG. 3 shows the bicycle of FIG. 1 in a maximum folded position.

In the embodiment shown in FIGS. 1 to 3, the bicycle -1- can be folded towards an intermediate folded position (FIG. 2) and a maximum folded position (FIG. 3).

In the intermediate folded position shown in FIG. 2, the pivoting block -2- is folded towards the front wheel -112- such that the chainstays -225- of the back fork -23- are located in a substantially vertical plane, such that the bicycle -1- can roll on its front and back wheels and the front wheel -112- can be steered freely towards the right and left. This intermediate folded position is useful when the bicycle is to be introduced in a space having reduced dimensions, for example in an elevator or in a storage room, or transported through a reduced space, such as for example on stairs or in hallways.

In the maximum folded position shown in FIG. 3, the front wheel -112- has been disassembled and the pivoting block -2- has been folded forward until the elastomeric plate -13- arranged in the front side -231- of the triangular connecting part -23- hits against the lower portion of the down tube -4- such that the back fork -22- is diagonally folded forward and the back wheel -227- is located below the down tube -4- and partially between the arms -111- of the front fork. In turn, the handlebar provided with a conventional folding mechanism -91- is folded laterally on the pivoting block -2- and the back wheel -227-, whereas the seat post -3- has been lowered to the lower position of the seat -31-.

Figure 4:
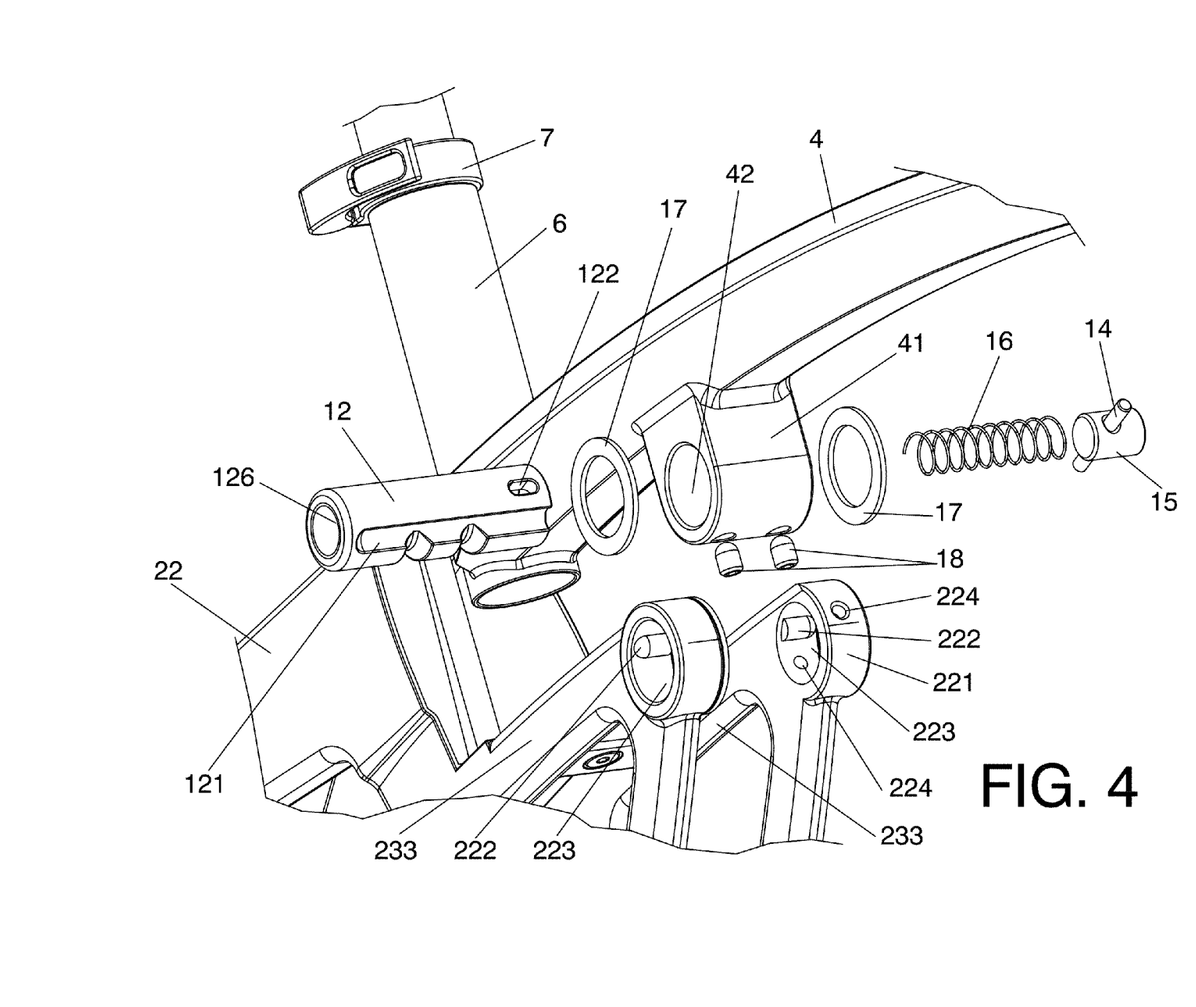
FIG. 4 is an exploded front perspective view of the components of a locking mechanism that can be integrated in the bicycle shown in FIGS. 1 to 3.

For maintaining the bicycle -1- in the locking positions shown in FIGS. 2 and 3, a locking mechanism such as that illustrated in FIG. 4 and the following figures and which will be described below can be provided.

The front ends -221- of the axial extensions -233- of the upper portion of the triangular connecting part -23- are provided with respective cylindrical holes -223-. A lug -41- emerging in the lower zone of the down tube -4- provided with a transverse cylindrical passage -42- aligned with the cylindrical holes -223- of the front ends -221- of the axial extensions -233- of the upper portion of the triangular connecting part -23- is arranged between said front ends -221-, such that the transverse shaft -12- traverses the cylindrical passage -42- and the cylindrical holes -223-, which allows the pivoting block -2- to rotate between the previously mentioned folded and unfolded positions of the bicycle -1-. Respective washers -17- through which the transverse shaft -12- passes and which reduce friction and aid in the pivoting of the pivoting block -2- are arranged between the sides of the lug -41- and the mentioned front ends -221-.

The cylindrical holes -223- of the axial extensions -233- have respective pairs of opposite inner ribs -222- fitting in a pair of complementary outer longitudinal grooves -121- provided in the periphery of the transverse shaft -12-, such that the transverse shaft -12- rotates integrally with the axial extensions -233- of the upper side -232- of the triangular connecting part -23- and, therefore, with the pivoting block -2-.

The transverse shaft -12- comprises an inner cylindrical axial passage -125- extending internally through at least a portion of the length of the transverse shaft -12- and having an open end and a closed portion, opposite the open end. An also cylindrical guide element -15- diagonally traversed by a perpendicular pin -14- is slidingly housed in the end portion adjacent to the open end of the axial passage -125-. The perpendicular pin -14- also traverses respective slits -122- located in diagonally opposite positions of the wall of the transverse shaft -12-, and is immobilized by its opposite ends in diagonally opposite openings -224- provided in the wall of one of the cylindrical holes -223- of the front end -221- of one of the axial extensions -233- of the upper portion of the triangular connecting part -23-. Each of the slits -122- has a proximal smaller edge adjacent to the open end of the axial passage -125- and a distal smaller edge spaced from the adjacent end of the open end of the axial passage -125- as well as two opposite larger edges extending between said smaller edges. A compressed coil spring -16- is arranged between the closed portion of the axial passage -125- and the end of the guide element -15- inserted in the axial passage -125-, such that it pushes the guide element -15- towards the open end of the axial passage -125- and, therefore, keeps the perpendicular pin -14- supported against the proximal smaller edges of the respective slits -122-. Likewise, the action of the spring -16- forces the distal end portion -126- of the transverse shaft -12- opposite the open end of the axial passage -125- to emerge laterally from the cylindrical hole -223- of the front end -221- of one of the axial extensions -233- of the upper portion of the triangular connecting part -23-. With this arrangement of elements, the transverse shaft -12- is coupled to the pivoting block -2-.

Two axially aligned bosses -18- emerging towards the inside of the cylindrical passage -42- are provided in the lower zone of the lug -41- and they have a height such that they are susceptible to being axially guided in any of the outer longitudinal grooves -121- of the transverse shaft -12-. The outer longitudinal grooves -121- are communicated by two outer radial grooves -123- provided with respective side recesses -124- extending towards the slits -122- of the transverse shaft -12-. The outer radial grooves -123- are sized for guiding the bosses -18- from one outer longitudinal groove to another, and away from and towards the side recesses -124-. In turn, the side recesses -124- are sized for retaining the respective bosses -18- in an intermediate locking position.

Figure 5:
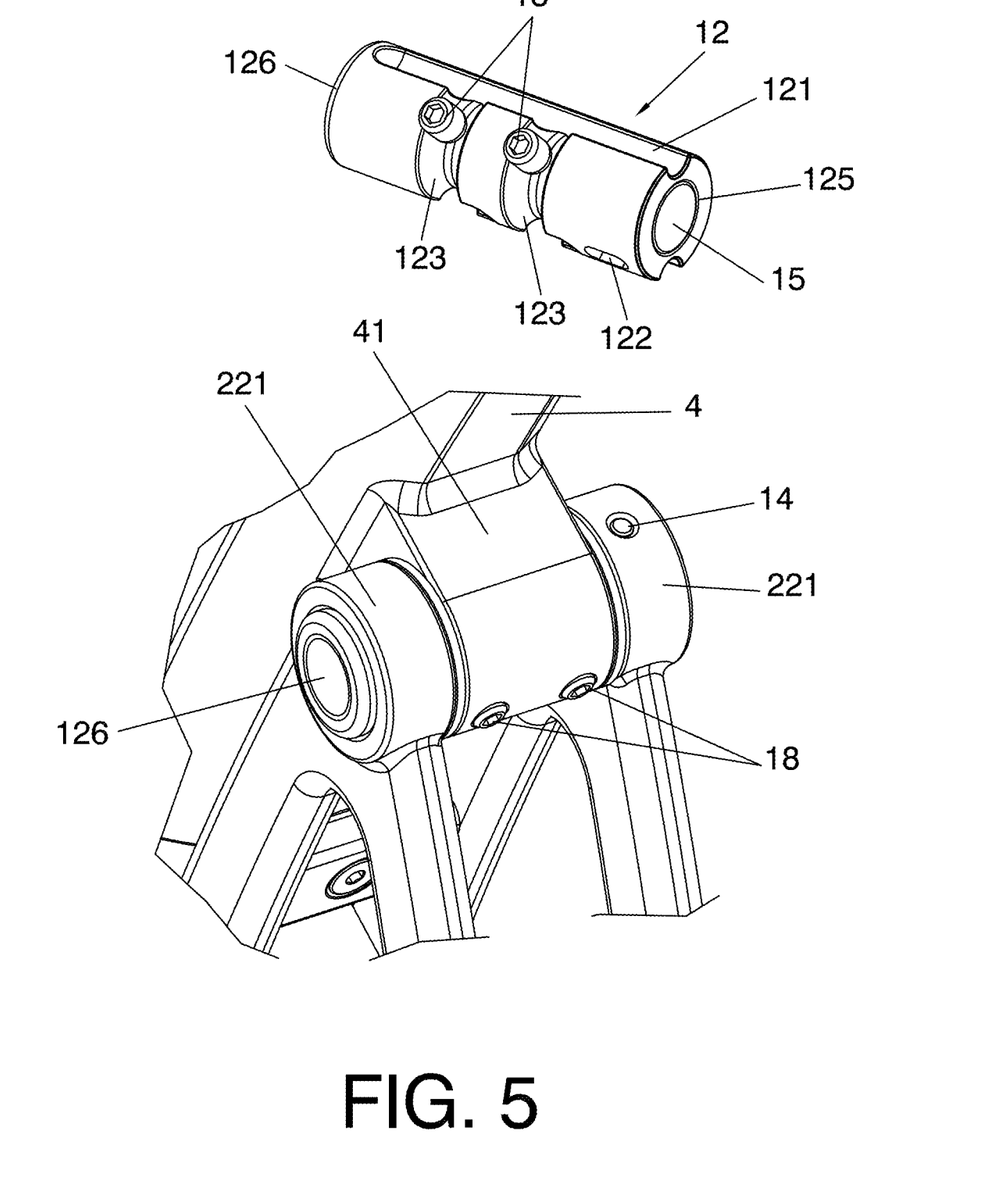
FIG. 5 shows in further detail some of the components of the locking mechanism and their respective positions at the start of a folding operation of the bicycle.

The locking mechanism described above functions as described below:

In the use position, i.e., in the unfolded position of the bicycle -1- in which the back fork -22- is axially aligned with the down tube -4-, the bosses -18- remain housed in one of the outer longitudinal grooves -121- of the transverse shaft -12-. Once the seat post -3- is extracted from the housing -235- of the triangular connecting part -23- for transitioning to the intermediate folded position described above in reference to FIG. 2, the distal end portion -126- of the transverse shaft -12- is pressed against the force of the coil spring -16- until the perpendicular pin -14- hits against the respective distal smaller edges of the slits -122- and the bosses -18- of the lug -41- are facing and can enter the respective outer radial grooves -123- when the pivoting block -2- connected to the horizontal shaft -12- is rotated. The corresponding position of the bosses -18- in the outer radial grooves -123- can be seen in FIG. 5.

Figure 6:
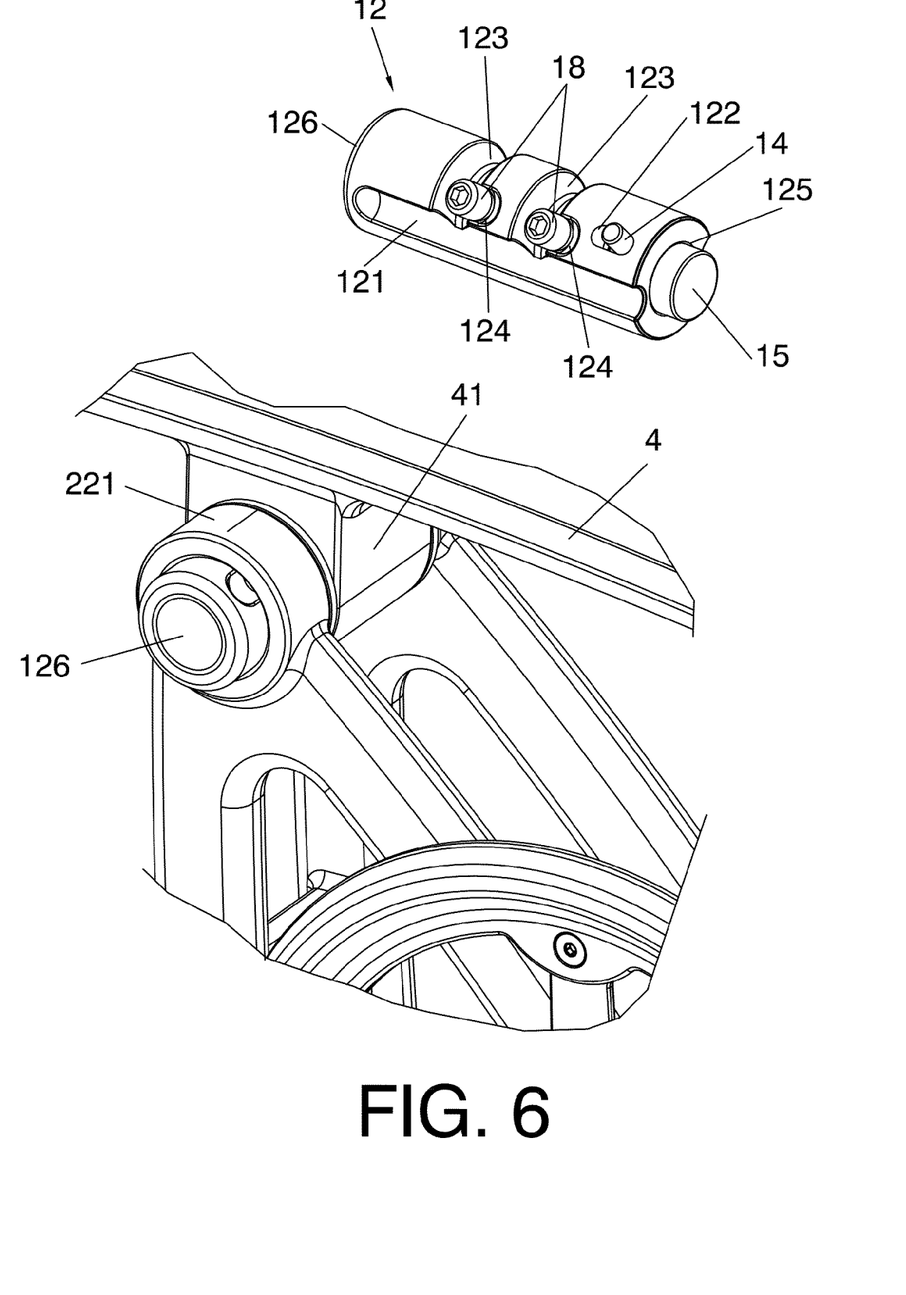
FIG. 6 shows in further detail some of the components of the locking mechanism and their respective positions when the bicycle is in the intermediate folded position shown in FIG. 2.

When the distal end portion -126- of the transverse shaft -12- is no longer pressed once the bosses -18- have entered the outer radial grooves -123- and the pivoting block -2- continues to be rotated, the action of the spring -16- makes the bosses -18- enter and remain locked in the side recesses -124- of the outer radial grooves -123- in said intermediate locking position (see FIG. 6) in which the bicycle -1- is folded and locked in the intermediate folded position described above in reference to FIG. 2.

Figure 7:
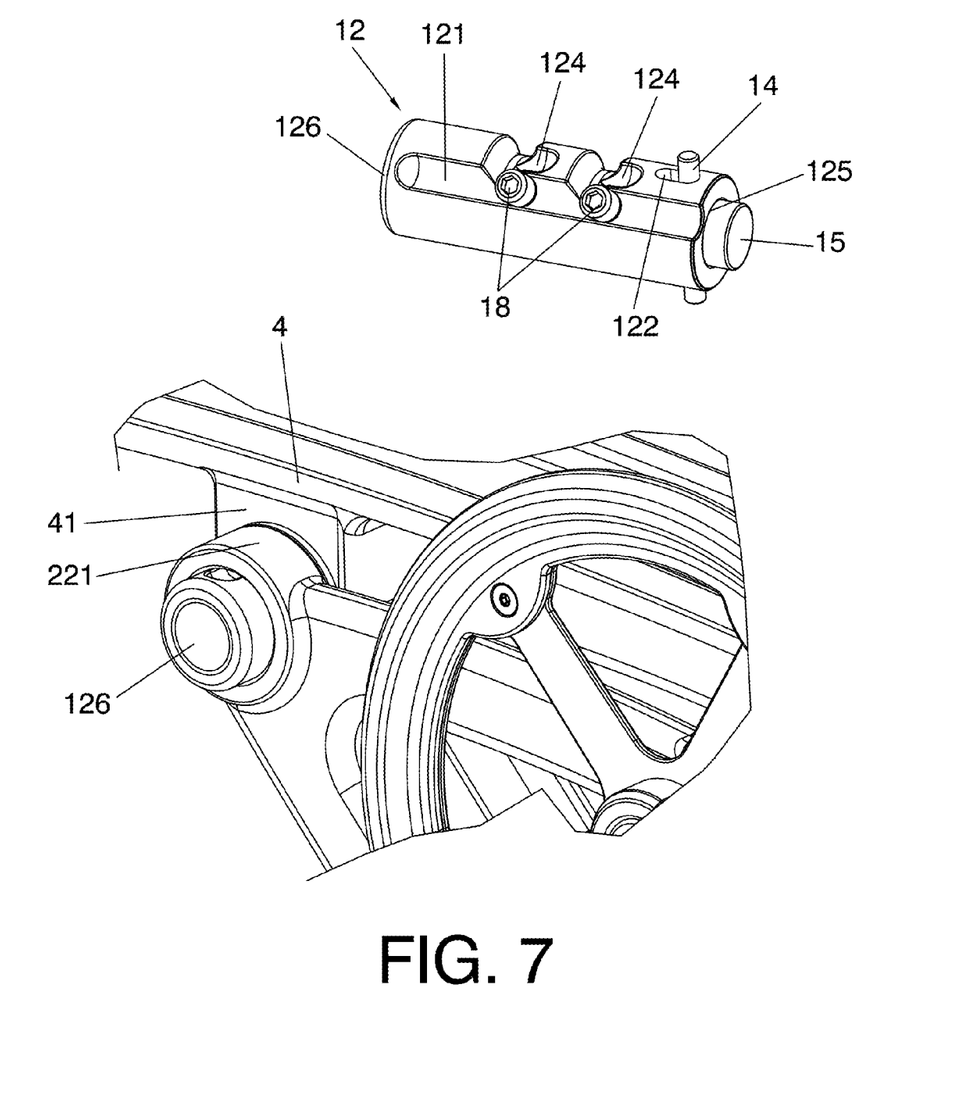
FIG. 7 shows in further detail some of the components of the locking mechanism and their respective positions when the bicycle is in the maximum folded position shown in FIG. 3.

For transitioning from the intermediate folded position shown in FIG. 2 to the maximum folded position of the bicycle -1- shown in FIG. 3, the distal end portion -126- of the transverse shaft -12- is pressed again against the force of the coil spring -16- until the perpendicular pin -14- again hits against the respective distal smaller edges of the slits -122- and the bosses -18- of the lug -41- are again facing and can enter the respective outer radial grooves -123- when the pivoting block -2- connected to the horizontal shaft -12- is further rotated until the bosses -18- enter the other outer longitudinal groove -121- of the transverse shaft -12- such that the horizontal shaft -12- cannot continue rotating such that if the distal end portion -126- of the horizontal shaft -12- is no longer pressed before or after the bosses -18- guided in the outer side grooves -123- have reached that other outer longitudinal groove -121-, the bosses -18- again become misaligned with respect to the outer radial grooves -123- due to the action of the coil spring -16- and the locking mechanism takes a maximum locking position. The corresponding position of the bosses -18- in the other outer longitudinal groove -121- can be seen in FIG. 7.

The invention claimed is:

1. Folding bicycle, particularly a pedal-assist bicycle, comprising
    a frame with a down tube with a back end with a seat tube and a front end with a steering tube susceptible to housing a stem connected in an upper zone to a handlebar and in a lower zone to a front fork, a back fork coupled to the back end of the down tube and a bottom bracket;
    a folding mechanism which allows folding the bicycle about an articulating pin to at least one folded position;
    a locking mechanism for keeping the bicycle in said folded position;
wherein
    the bottom bracket is integrated in a lower portion of a triangular connecting part emerging in the lower zone of a front portion of the back fork;
    the connecting part comprises an upper side with a back portion attached in the lower zone to the front portion of the back fork and with at least one cantilevered axial extension which extends below and is connected to the down tube in an unfolded position of the bicycle;
    the axial extension comprises at least one front end articulated in the lower zone to the down tube by means of a transverse shaft, such that the back fork and the connecting part form a pivoting block susceptible to rotating jointly in a vertical plane towards the steering tube to said folded position;
    the front portion of the back fork is connected to the back end of the down tube in the unfolded position of the bicycle.

2. Folding bicycle according to claim 1, wherein the connecting part is a triangular part the upper side of which comprises said axial extension, and comprising a front upper vertex in which said front end articulated to the down tube is located and a lower vertex in which the bottom bracket is integrated.

3. Folding bicycle according to claim 1, wherein an elastomeric plate is arranged in the front side of the connecting part preventing direct contact of the front side of the connecting part and the down tube when the front side of the triangular connecting part remains connected to the down tube in the completely folded position of the bicycle.

4. Folding bicycle according to claim 1 wherein the connecting part comprises a housing which is axially aligned with the seat tube in the unfolded position of the bicycle for housing the lower portion of a seat post lockable in the seat tube by fixing means.

5. Bicycle according to claim 4, wherein the fixing means comprise a quick-tightening clamp.

6. Bicycle according to claim 1, wherein the front portion of the back fork comprises a front face in which an inner seal made of an elastically flexible material is arranged, which is trapped between the back end of the down tube and the front face of the front portion of the back fork in the unfolded position of the bicycle.

7. Bicycle according to claim 1, wherein the back end of the down tube comprises a back portion projecting from the seat tube.

8. Folding bicycle according to claim 1, wherein the axial extension comprises a pair of front ends spaced from one another and provided with respective cylindrical holes transversely aligned with one another and with respect to a cylindrical passage with a lug emerging in the lower zone of the down tube, such that the transverse shaft is housed in said cylindrical passage and in said cylindrical holes, an articulation thus being formed for the pivoting block.

9. Folding bicycle according to claim 1, further including two cantilevered axial extensions spaced from one another with respective front ends spaced from one another and provided with respective cylindrical holes transversely aligned with one another and with respect to a cylindrical passage of a lug emerging in the lower zone of the down tube, such that the transverse shaft is housed in said cylindrical passage and in said cylindrical holes, an articulation thus being formed for the pivoting block.

10. Folding bicycle according to claim 8, wherein the cylindrical holes in the axial extensions have respective pairs of opposite inner ribs fitting in a pair of complementary outer longitudinal grooves in the periphery of the transverse shaft, such that the transverse shaft rotates integrally with the axial extensions of the upper side of the connecting part.

11. Folding bicycle according to claim 10, wherein
    the transverse shaft comprises an cylindrical inner axial passage extending internally through at least a portion of the length of the transverse shaft and having an open end and a closed portion, opposite the open end;
    an also cylindrical guide element diagonally traversed by a perpendicular pin is slidingly housed in the end portion adjacent to the open end of the axial passage;
    the perpendicular pin also traverses respective slits located in diagonally opposite positions of a wall of the transverse shaft, and is immobilized by opposite ends of the perpendicular pin in diagonally opposite openings provided in the wall of one of the cylindrical holes of the front end of one of the axial extensions of the upper portion of the triangular connecting part;
    each of the slits has a proximal smaller edge adjacent to the open end of the axial passage and a distal smaller edge spaced from the neighboring end of the open end of the axial passage as well as two opposite larger edges extending between said smaller edges;

a compressed coil spring is arranged between the closed portion of the axial passage and the end of the guide element inserted in the axial passage such that it pushes the guide element towards the open end of the axial passage and keeps the perpendicular pin supported against the proximal smaller edges of the respective slits.

12. Folding bicycle according to claim 11, wherein the coil spring forces the distal end portion of the transverse shaft opposite the open end of the axial passage to emerge laterally from the cylindrical hole of the front end of one of the axial extensions of the upper portion of the triangular connecting part.

13. Folding bicycle according to claim 11, wherein two axially aligned bosses emerging towards the inside of the cylindrical passage are provided in the lower zone of the lug and the two axially aligned bosses have a height such that the two axially aligned bosses are susceptible to being axially guided in any of the outer longitudinal grooves of the transverse shaft;

the outer longitudinal grooves are communicated by two outer radial grooves each having a side recess;

the outer radial grooves are sized for guiding the bosses from one of the outer longitudinal grooves to the other, and away from and towards the side recesses.

14. Folding bicycle according to claim 13, wherein the side recesses extending towards the slits of the transverse shaft and are sized for retaining the respective bosses in an intermediate locking position.

* * * * *